(12) United States Patent
Anderson et al.

(10) Patent No.: US 7,360,729 B2
(45) Date of Patent: Apr. 22, 2008

(54) FOOD WASTE DISPOSER SHREDDER ASSEMBLY

(75) Inventors: Scott W Anderson, Racine, WI (US); Steven P Hanson, Racine, WI (US); Joseph G Farmerie, Muskego, WI (US); James R Patterson, Racine, WI (US)

(73) Assignee: Emerson Electric Co., St. Louis, MO (US)

( * ) Notice: Subject to any disclaimer, the term of this patent is extended or adjusted under 35 U.S.C. 154(b) by 384 days.

(21) Appl. No.: 10/908,056

(22) Filed: Apr. 26, 2005

(65) Prior Publication Data

US 2005/0236502 A1    Oct. 27, 2005

Related U.S. Application Data

(60) Provisional application No. 60/521,437, filed on Apr. 26, 2004.

(51) Int. Cl.
*B02C 23/36* (2006.01)

(52) U.S. Cl. .................................. 241/46.013

(58) Field of Classification Search ..............................
241/46.013–46.017
See application file for complete search history.

(56) References Cited

U.S. PATENT DOCUMENTS

| | | | |
|---|---|---|---|
| 1,456,034 A | 5/1923 | Newman | |
| 2,939,639 A | 6/1960 | Coss | |
| 3,545,684 A * | 12/1970 | Hilmanowski et al. | 241/33 |
| 3,940,115 A | 2/1976 | Zipperer | |
| 4,168,035 A | 9/1979 | Palm et al. | |
| 4,201,345 A | 5/1980 | Ziegler | |
| 4,720,050 A | 1/1988 | Eberhardt | |
| 5,407,271 A | 4/1995 | Jorgensen et al. | |
| 5,413,287 A | 5/1995 | Telsnig | |
| 5,511,729 A | 4/1996 | Husain | |
| 5,531,385 A | 7/1996 | Witsken | |
| 5,628,334 A | 5/1997 | Edwards et al. | |

(Continued)

FOREIGN PATENT DOCUMENTS

FR    1 098 964 A    8/1955

(Continued)

OTHER PUBLICATIONS

International Search Report and Written Opinion of corresponding International Patent Application No. PCT/US2005/014379.

*Primary Examiner*—Mark Rosenbaum
*Assistant Examiner*—Debra M Wolfe
(74) *Attorney, Agent, or Firm*—Harness, Dickey & Pierce P.L.C.

(57) ABSTRACT

A shredder assembly for a food waste disposer that includes an impact mechanism for freeing jams. The impact mechanism uses the stored energy in the rotating portion of the disposer's rotating elements to be transmitted from the rotor shaft via an impact member to a part of the rotating shredder assembly. The shredder assembly includes a rotatable shaft and an impact member fixedly attached to the shaft to rotate therewith. A shredder disk is attached to the shaft via a clutch allowing the shredder disk to slip relative to the shaft when the shredder disk jams, wherein the impact member strikes the shredder disk to transfer rotational energy to the jam.

15 Claims, 7 Drawing Sheets

U.S. PATENT DOCUMENTS

| | | | |
|---|---|---|---|
| 5,676,319 A | 10/1997 | Stiggins et al. | |
| 5,779,165 A | 7/1998 | Kim | |
| 5,791,566 A | 8/1998 | Higo et al. | |
| 5,971,304 A | 10/1999 | Sullivan | |
| 6,007,006 A | 12/1999 | Engel et al. | |
| 6,010,086 A | 1/2000 | Earle, III et al. | |
| 6,012,662 A | 1/2000 | Sullivan | |
| 6,109,551 A | 8/2000 | Sullivan | |
| 6,264,123 B1 | 7/2001 | Clark | |
| 6,412,714 B1 | 7/2002 | Witsken et al. | |
| 6,439,487 B1 | 8/2002 | Anderson et al. | |
| 6,454,872 B1 | 9/2002 | Miller et al. | |
| 6,471,467 B1 | 10/2002 | Pagalday | |
| 6,481,652 B2 | 11/2002 | Strutz et al. | |
| 6,772,968 B2 | 8/2004 | Jara-Almonte et al. | |
| 6,854,673 B2 * | 2/2005 | Strutz et al. | 241/46.013 |

FOREIGN PATENT DOCUMENTS

| | | |
|---|---|---|
| GB | 630 494 A | 10/1949 |

\* cited by examiner

FIG. 13

FOOD WASTE DISPOSER SHREDDER ASSEMBLY

CROSS-REFERENCE TO RELATED APPLICATION

This application is a non-provisional application of U.S. Provisional Patent Application Ser. No. 60/521,437, filed on Apr. 26, 2004, which is incorporated by reference.

BACKGROUND

The present disclosure relates generally to food waste disposers, and more particularly, to grinding mechanisms for food waste disposers.

Food waste disposers are used to comminute food scraps into particles small enough to safely pass through household drain plumbing. A conventional disposer includes a food conveying section, a motor section, and a grinding mechanism disposed between the food conveying section and the motor section. The food conveying section includes a housing that forms an inlet for receiving food waste and water. The food conveying section conveys the food waste to the grinding mechanism, and the motor section includes a motor imparting rotational movement to a motor shaft to operate the grinding mechanism.

The grind mechanism that accomplishes the comminution is typically composed of a rotating shredder assembly with lugs and a stationary grind ring. The motor turns the shredder plate and the lugs force the food waste against the grind ring where it is broken down into small pieces. Once the particles are small enough to pass out of the grinding mechanism, they are flushed out into the household plumbing.

Grind mechanisms that utilize a fixed lug on the rotating shredder assembly are often susceptible to jams when grinding hard food waste, such as beef bones. The use of an induction motor may contribute to the probability of experiencing a jam because of its relatively low stall torque. To reduce the occurrences of jams, swivel, or rotatable, lugs that move out of the way before a jam can occur are employed. However, with swivel lugs, the energy displaced to the food waste is less and therefore can result in compromised grind performance.

The present application addresses shortcomings associated with the prior art.

SUMMARY

Among other things, a grind mechanism for a food waste disposer that includes an impact mechanism for freeing jams is disclosed. The impact mechanism uses the stored energy in the disposer's rotating elements to be transmitted to the disposer's motor shaft from an impact member to a part of the rotating shredder assembly. This energy is then transmitted to the lug and to the fixed lugs and to the food waste particle that is creating the jam. The impact energy then breaks up the food waste particle, freeing the jam.

In accordance with certain teachings of the present disclosure, a shredder assembly for a food waste disposer includes a rotatable shaft and an impact member fixedly attached to the shaft to rotate therewith. A shredder disk is attached to the shaft via a clutch allowing the shredder disk to slip relative to the shaft when the shredder disk jams, wherein the impact member strikes the shredder disk to transfer rotational energy to the jam. In certain exemplary embodiments, the shredder disk includes a support member attached thereto, wherein the impact member strikes the support member when the shredder disk slips.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
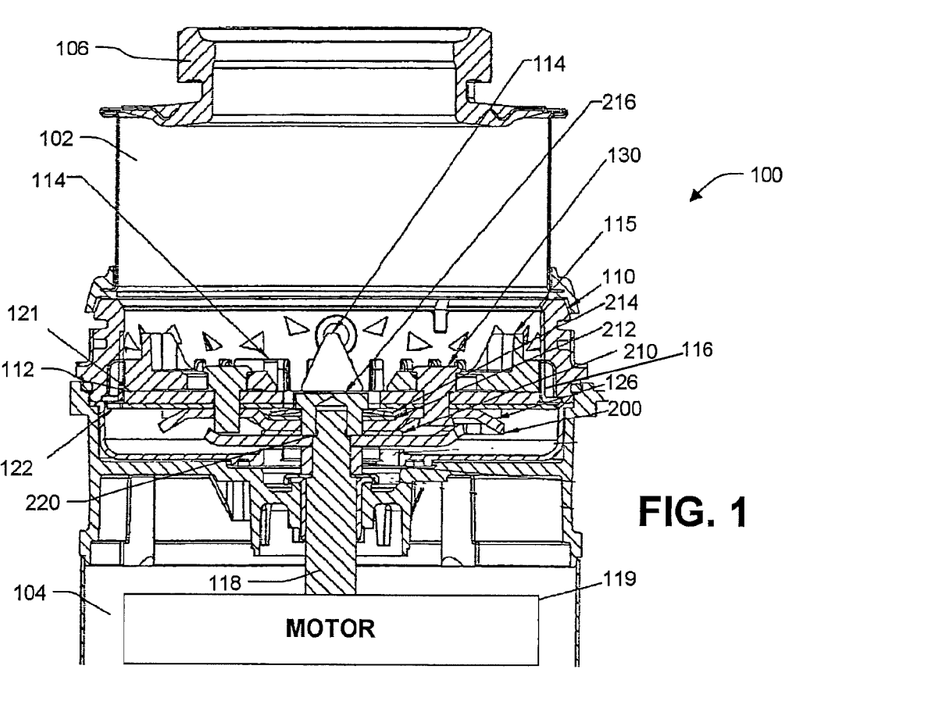
FIG. 1 is a sectional view of an exemplary food waste disposer including a grinding mechanism in accordance with the present disclosure.

FIG. 1 is a sectional view illustrating portions of an exemplary food waste disposer embodying certain teachings of the present disclosure. The food waste disposer 100 includes a food conveying section 102 and a grinding mechanism 110, which is disposed between the food conveying section and a motor section 104. The food conveying section 102 includes an inlet for receiving food waste and water. The food waste is conveyed to the grinding mechanism 110, and the motor section 104 includes a motor 119 imparting rotational movement to a motor shaft 118 to operate the grinding mechanism 110.

The grinding mechanism 110 includes a stationary grind ring 116 that is fixedly attached to an inner surface of the housing of the grind mechanism 110. A rotating shredder plate assembly 112 is rotated relative to the stationary grind ring 116 by the motor shaft 118 to reduce food waste delivered by the food conveying section to small pieces. When the food waste is reduced to particulate matter sufficiently small, it passes from above the shredder plate assembly 112, and along with water passing through the food conveying section, is then discharged from the disposer.

Figure 2:
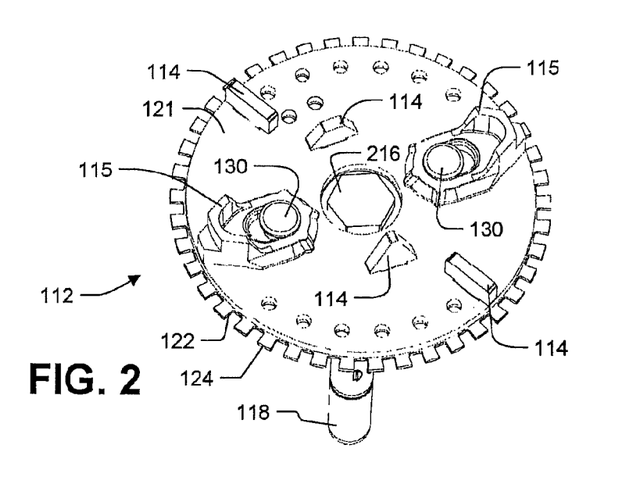
FIGS. 2 and 3 are perspective views of a grinding mechanism embodying aspects of the present disclosure.
Figures 3, 4:
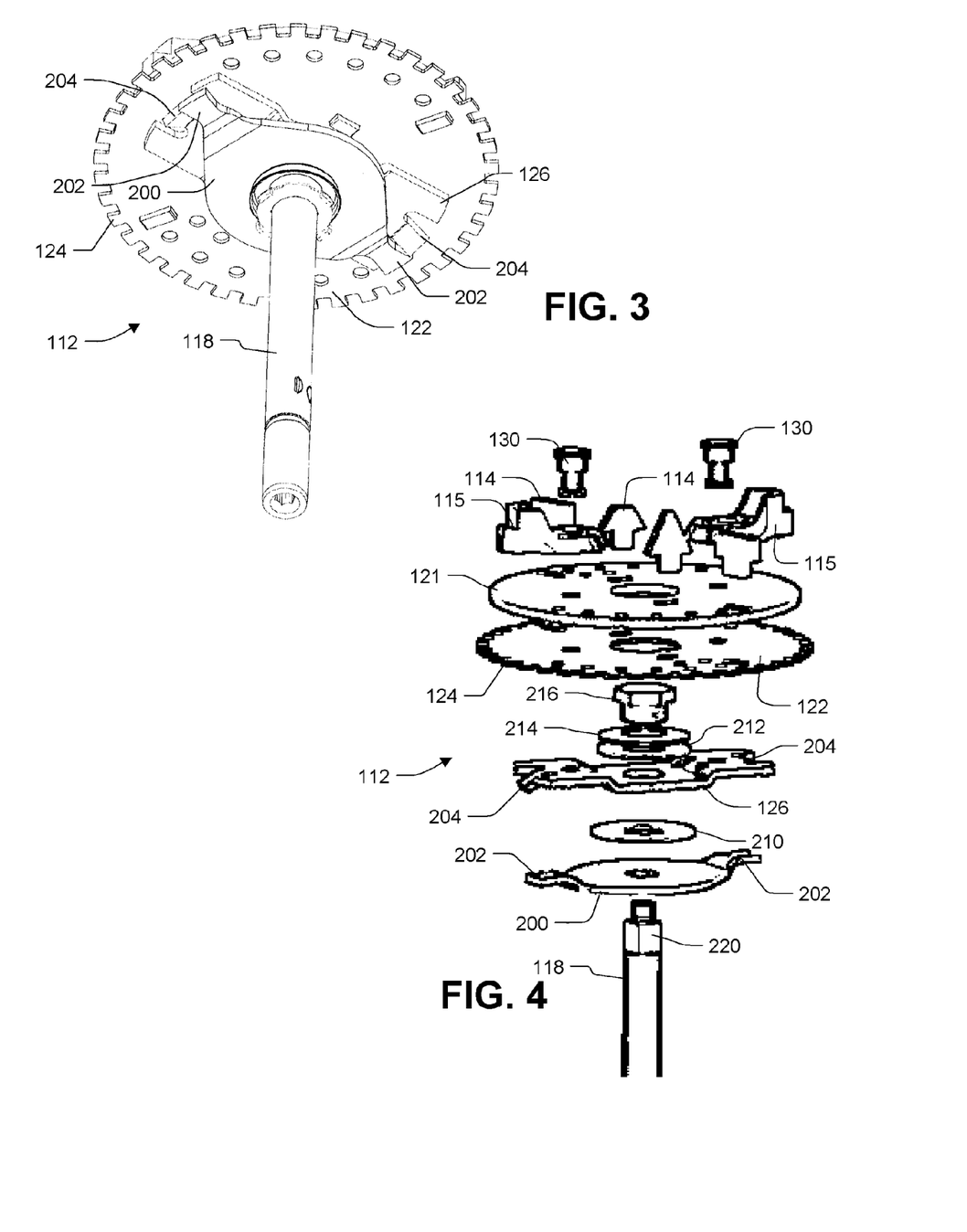
FIG. 4 is an exploded view of the grinding mechanism illustrated in FIGS. 2 and 3.

FIGS. 2 and 3 are top and bottom perspective views, respectively, showing the shredder plate assembly 112 and motor shaft 118. FIG. 4 is an exploded view of the shredder plate assembly 112 and shaft 118. The particular shredder plate assembly 112 illustrated in FIGS. 2-4 includes multiple, stacked plates to provide a plurality of levels for multi-stage chopping or cutting of food waste. The illustrated embodiment includes two stacked shredder disks 121, 122 and a support plate 126. Fixed lugs 114 extend upwards from the upper shredder disk 121, as well as swivel lugs 115, which are attached by swivel rivets 130 to the assembly 112.

Figure 5:
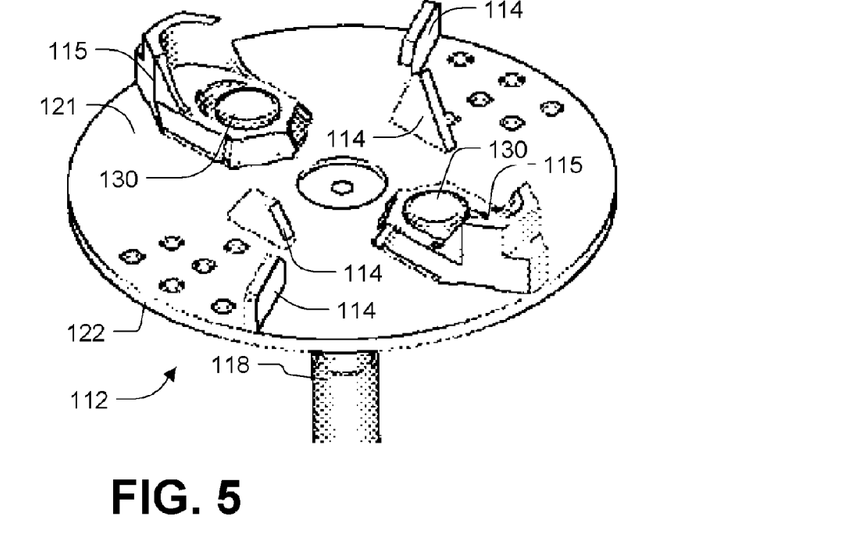
FIGS. 5 and 6 are perspective views of an alternative grinding mechanism embodying aspects of the present disclosure.
Figure 6:
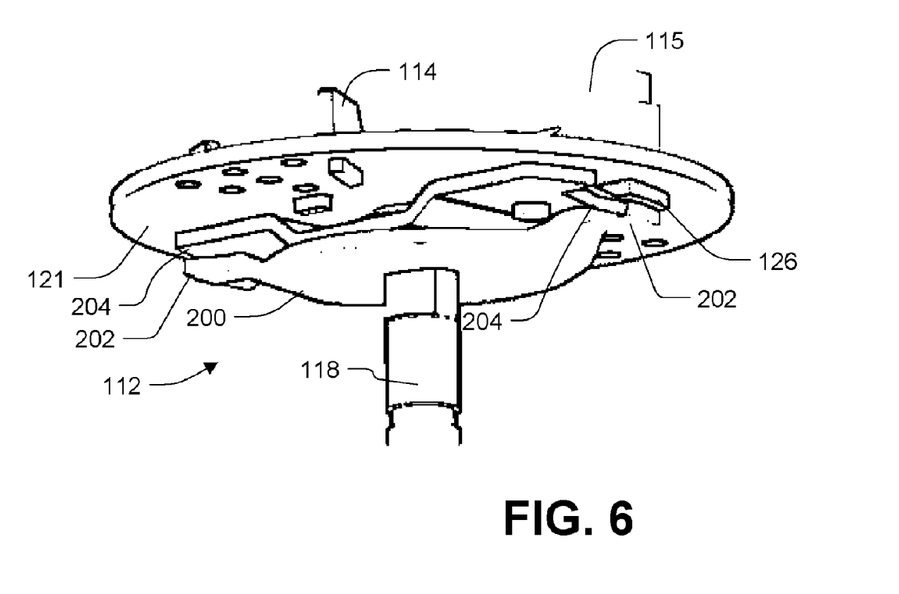
Figure 7:
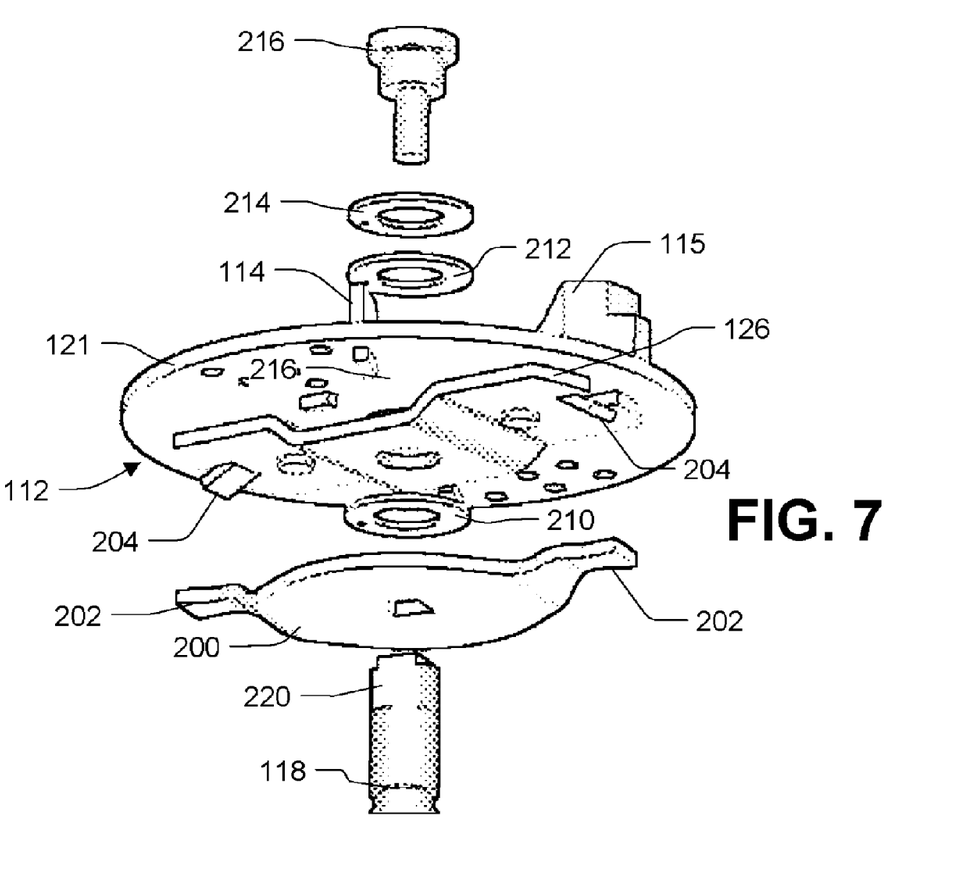
FIG. 7 is an exploded view of the grinding mechanism illustrated in FIGS. 5 and 6.

The lower disk 122 defines teeth 124 about the periphery of the disk 122 for chopping food wastes. Further, the lower disk 122 defines a radius larger than the upper disk 121, such that the teeth 124 extend beyond the periphery of the upper disk 121 to provide an "under cutting" arrangement, in which the lower disk 122 extends below a portion of the grind ring 116. FIGS. 5-7 show various views of an alternative embodiment having a single disk 121 for the rotating shredder plate.

Figure 8A:
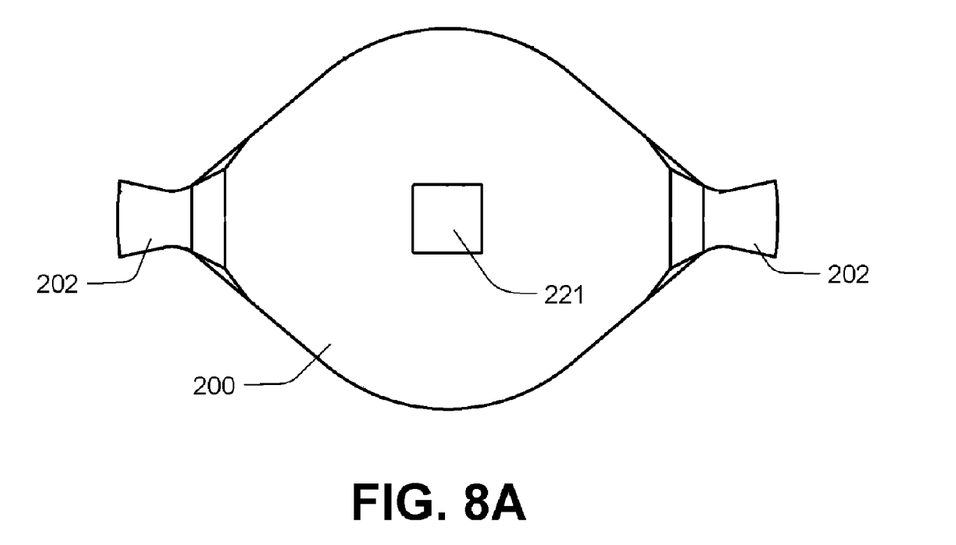
FIGS. 8A and 8B are top and side views of an exemplary t-bar impact mechanism disclosed herein.
Figure 8B:
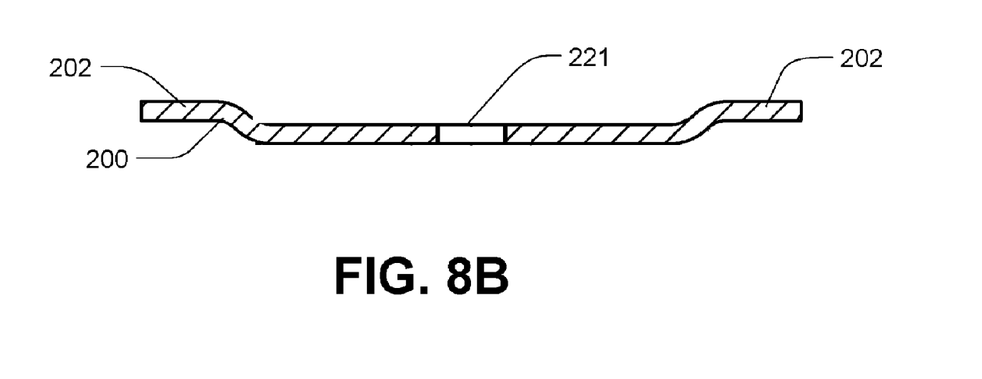

As noted above in the Background section hereof, fixed lugs in general can be prone to jams with hard objects such as bones. To address this, the illustrated embodiment includes an impact member 200 that is secured directly to the shaft 118 of the motor so as to rotate with the shaft. In the exemplary illustrated embodiments, the impact member 200 comprises a "T-bar." FIGS. 8A and 8B show top and side views illustrating one exemplary T-bar 200. In certain embodiments, the shaft 118 includes a square drive portion 220 that is received by a corresponding square opening 221 extending through the impact member 200.

The shredder assembly 112 is not fixedly attached to the shaft 118, but rather, is attached such that it slips if the disposer load increases beyond some predetermined level, such as when the disposer jams. In the illustrated exemplary embodiment, the support plate 126 is captured by a series of components that create a slip clutch. This clutch allows the rotating shredder assembly 112 to turn with the shaft 118 when not under load, but when the disposer is loaded or meets with a jam, the clutch slips allowing the assembly 112, which includes the support plate 126, to be impacted by the T-bar 200. Since the T-bar 200 is fixedly attached to the rotating shaft 118, it continues to rotate with the shaft 118 when the shredder plate assembly 112 stops rotating due to the clutch slipping. The impact member 200 rotating with the shaft 118 strikes the support plate 126 of the shredder plate assembly 112, transferring rotational energy to the jam to free the jam, or material creating the load.

More specifically, in the embodiment shown in FIGS. 3-8, the impact member 200 defines tabs 202 that extend upwardly towards the bottom of the shredder plate assembly 112. When a jam occurs causing the clutch to slip, the tabs 202 of the rotating impact member 200 contact downwardly extending tabs 204 of the support member 126.

The clutch consists of a thrust washer 210 immediately above the T-bar 200 and another thrust washer 212 immediately above the support plate 126. A cupped spring, or Belleville, washer 214 and a cap nut 216 secure the clutch and rotating shredder assemblies 112 on the shaft 118. The Belleville washer 214 maintains the predetermined preload so as to maintain a controlled slip point in the clutch. The thrust washers 210, 212 may be made of a polymeric material that is non-corrosive, non-hydroscopic and abrasion resistant. All metallic components preferably are stainless steel to avoid corrosion. The T-bar 200, support plate 126 and the square drive portion 220 of the shaft 118 are heat treated to increase the mechanical properties to acceptable levels.

Figure 9:
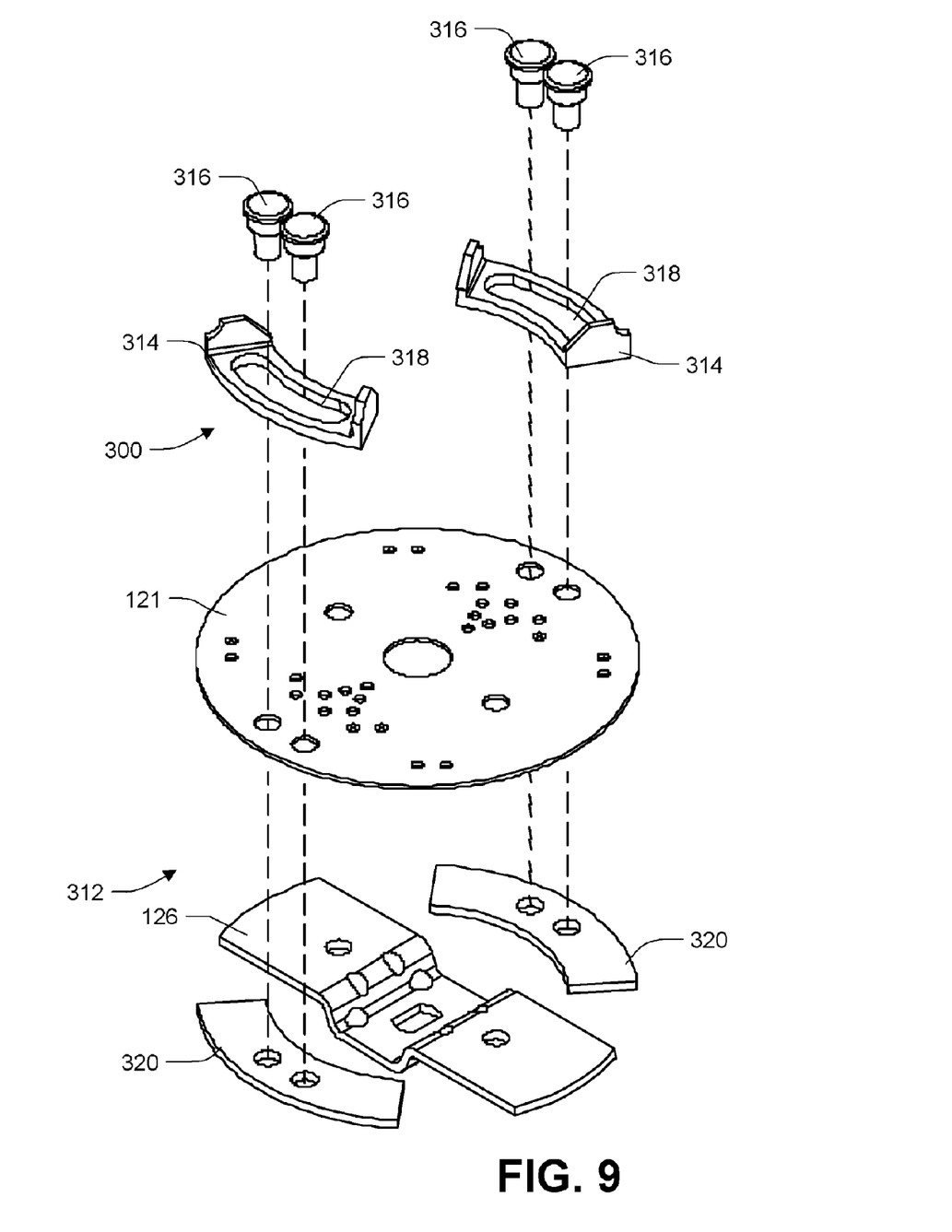
FIG. 9 is an exploded view of a grinding mechanism having an alternative impact mechanism.

An impact mechanism 300 in accordance with an alternative embodiment is shown in FIG. 9. A rotating shredder plate assembly 312 includes a shredder disk 121 and a support plate 126. The impact mechanism 300 includes sliding lugs 314 that are retained by rivets 316 extending through the rotating shredder assembly 312. The rivets 316 extend through a slot 318 in the lugs 314, through openings in the shredder disk 121, and through spacers 320. The impacting occurs between the rivets 316 and the lugs 314. In essence, the lugs 314 slide concentrically to the rotating shredder assembly 312 about the lug retaining rivets 316.

Figure 10:
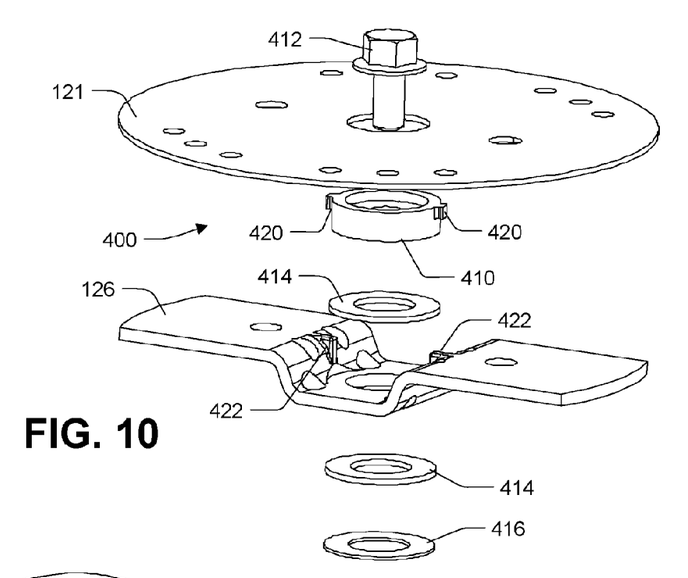
FIG. 10 is an exploded view of a grinding mechanism having another alternative impact mechanism.

Another alternative embodiment is illustrated in FIG. 10. An impact mechanism 400 includes a cup-shaped anvil 410 secured directly to the motor shaft by a bolt 412. The anvil 410 is situated between the shredder disk 121 and the support plate 126. Thrust bearings 414 are positioned above and below the support plate 126, with a thrust washer 416 below the lower thrust bearing 414. Lugs 420 on the anvil 410 impact mating lugs 422 integral to the support plate 126 to dislodge jams.

Figure 11:
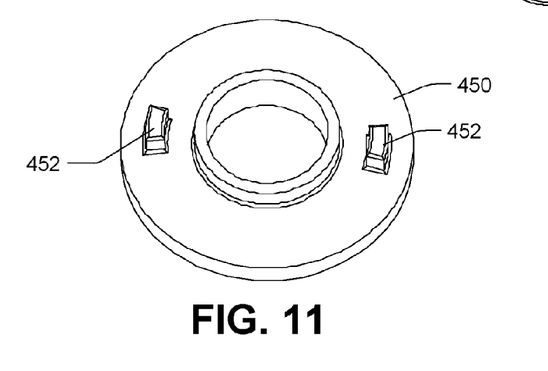
FIGS. 11-13 illustrate yet another alternative impact mechanism.
Figure 12:
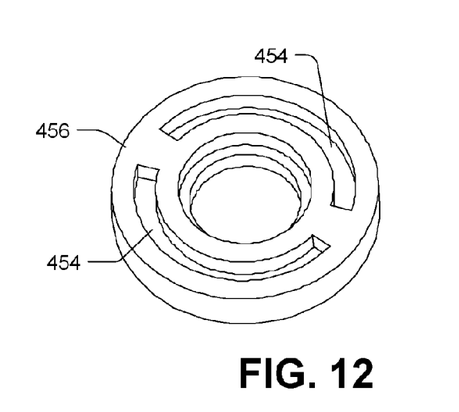
Figure 13:
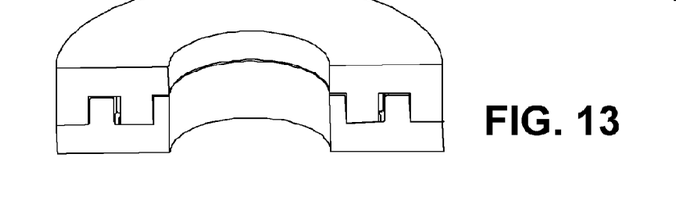

Another impact mechanism shown in FIGS. 11-13 includes a two piece anvil system. A lower anvil 450 has tabs 452 extending therefrom that are slidably received by grooves 454 in an upper anvil 456. One of the anvil members is fixedly attached to the shaft 118 to rotate therewith, while the other anvil member is attached via the clutch so that it slips relative to the shaft upon a disposer jam. The two anvils 450, 456 are thus movable relative to each other, with the tabs 452 impacting the ends of the grooves 454 to dislodge jams.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A food waste disposer system, comprising:
    a stationary grind ring;
    a motor driving a rotatable shaft;
    a shredder disk attached to the shaft via a clutch allowing the shredder disk to rotate with the shaft relative to the stationary grind ring and to slip relative to the shaft when the shredder disk jams; and
    an impact member fixedly attached to the shaft to rotate therewith, so that when the shredder disk jams, the impact member strikes the shredder disk to transfer rotational energy to the jam.

2. The food waste disposer system of claim 1, wherein the shredder disk includes a support member attached thereto, wherein the impact member strikes the support member when the shredder disk slips.

3. The food waste disposer system of claim 2, wherein the clutch includes first and second thrust washers situated on opposite sides of the support member, a preload washer situated adjacent the first thrust washer, and a fastener connecting the clutch and the support member to the shaft.

4. The food waste disposer system of claim 3, wherein the fastener comprises a nut threadably received on the shaft.

5. The food waste disposer system of claim 2, wherein the impact member defines tabs extending therefrom that contact tabs extending from the support member when the clutch slips.

6. The food waste disposer system of claim 1, wherein the shaft defines a square drive portion and wherein the impact member defines a square opening therethrough receiving the square drive portion of the shaft.

7. The food waste disposer system of claim 1, wherein the shredder disk comprises a plurality of stacked disks.

8. The food waste disposer system of claim 1, wherein the shredder disk includes lugs extending therefrom.

9. The food waste disposer system of claim 8, wherein the lugs are fixed lugs.

10. The food waste disposer system of claim 8, wherein the lugs are swivel lugs.

11. The food waste disposer system of claim 1, wherein the impact member includes lugs slidably attached to the shredder disk by rivets extending through the lugs and the shredder disk.

12. The food waste disposer system of claim 5, wherein the support member is situated between the impact member and the shredder disk.

13. The food waste disposer system of claim 5, wherein the impact member is situated between the support member and the shredder disk.

14. The food waste disposer system of claim 13, wherein the impact member includes a generally cup-shaped anvil having tabs extending therefrom.

15. The food waste disposer system of claim 2, wherein the impact member includes first and second anvil members, the first anvil member having tabs extending therefrom that are received in slots defined in the second anvil member.

* * * * *